United States Patent
Chang et al.

(10) Patent No.: US 10,262,062 B2
(45) Date of Patent: Apr. 16, 2019

(54) NATURAL LANGUAGE SYSTEM QUESTION CLASSIFIER, SEMANTIC REPRESENTATIONS, AND LOGICAL FORM TEMPLATES

(71) Applicant: Adobe Inc., San Jose, CA (US)

(72) Inventors: Walter Wei-Tuh Chang, San Jose, CA (US); Codruta L. Girlea, Urbana, IL (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/977,334

(22) Filed: Dec. 21, 2015

(65) Prior Publication Data
US 2017/0177715 A1  Jun. 22, 2017

(51) Int. Cl.
| | |
|---|---|
| G06F 17/27 | (2006.01) |
| G06F 17/28 | (2006.01) |
| G06F 17/30 | (2006.01) |
| G06F 17/24 | (2006.01) |
| G06N 99/00 | (2019.01) |
| G10L 15/18 | (2013.01) |
| G10L 15/06 | (2013.01) |

(52) U.S. Cl.
CPC ...... *G06F 17/30705* (2013.01); *G06F 17/248* (2013.01); *G06F 17/2785* (2013.01); *G06F 17/30654* (2013.01); *G06N 99/005* (2013.01); *G06F 17/30684* (2013.01); *G10L 15/1822* (2013.01); *G10L 2015/0631* (2013.01); *G10L 2015/0635* (2013.01)

(58) Field of Classification Search
None
See application file for complete search history.

(56) References Cited

U.S. PATENT DOCUMENTS

| | | | |
|---|---|---|---|
| 7,403,938 B2* | 7/2008 | Harrison | G06F 17/30663 |
| 8,843,473 B2* | 9/2014 | Huang | G06F 17/30451 |
| | | | 707/713 |
| 9,575,963 B2* | 2/2017 | Pasupalak | G06F 17/27 |
| 2002/0059161 A1* | 5/2002 | Li | G06F 17/30622 |
| 2003/0214523 A1* | 11/2003 | Wang | G06F 3/023 |
| | | | 715/700 |
| 2006/0206481 A1* | 9/2006 | Ohkuma | G06F 17/30654 |
| 2012/0166942 A1* | 6/2012 | Ramerth | G06F 17/241 |
| | | | 715/257 |

(Continued)

*Primary Examiner* — Richard Z Zhu
(74) *Attorney, Agent, or Firm* — Wolfe-SBMC

(57) ABSTRACT

Natural language system question classifier, semantic representations, and logical form template techniques and systems are described. In one or more implementations, a natural language input is classified as corresponding to respective ones of a plurality of classes of questions. A semantic intent of the natural language input is extracted as a semantic entity and a semantic representation. Question classification labels that classify the question included in the natural language input is then used to select at least one of a plurality of logical form templates. The semantic intent that is extracted from the natural language input is then used to fill in the selected logical form templates, such as to fill in entity, subject, predicate, and object slots using the semantic entity and semantic representation. The filled-in logical form template is then mapped to form a database query that is then executed to query a database to answer the question.

20 Claims, 16 Drawing Sheets

(56) References Cited

U.S. PATENT DOCUMENTS

| | | | |
|---|---|---|---|
| 2014/0052444 A1* | 2/2014 | Roberge | G10L 15/08 704/243 |
| 2014/0365502 A1* | 12/2014 | Haggar | G06N 5/02 707/748 |
| 2015/0039292 A1* | 2/2015 | Suleman | G06F 17/289 704/9 |
| 2015/0149440 A1* | 5/2015 | Bornea | G06F 17/30442 707/719 |
| 2016/0188565 A1* | 6/2016 | Robichaud | G06F 17/278 704/9 |

* cited by examiner

"What was the average conversion time across all software subscribers from California who subscribed anytime from 2014-Q1 until 2015-Q2?"

Question type:
NUMERIC -
average

204 has(subscribers, x) and
max("conversion time") and
product-of(subscribers, software) and
state-of(subscribers, California) and
when(subscribers, subscribed, 2014-Q1 until 2015-Q2)

216

SELECT max(conversion_time)
FROM Subscriptions_Table
WHERE state_province = 'CA'
AND product = 'software'
AND cp_joining_dtr >= '2014-Q1'
AND cp_joining_dtr <= '2015-Q2'

```
SELECT state,
    Subscription_type,
    avg(days_to_convert),
    count(subscriber_token) Subscribers
FROM
    (SELECT if(CAST(state_province AS CHAR(256)) IN('NULL','','<unknown>'),'(no profile info)',state_province) state,
        if(CAST(entitlement_type AS CHAR(256)) IN('NULL','','<unknown>'),'(no profile info)',entitlement_type)
            Subscription_Type,
        if(CAST(conversion_interval_days_cbo AS CHAR(256) IN('NULL',
            info)',conversion_interval_days_cbo) DAYS_TO_CONVERT,
    FROM Adobe(CC_2014Q1_2015Q2 /* CC Subscribers */
    WHERE most_launched_product IN(' Software ')
    AND state_province = 'CA'
    AND cc_joining_fiscal_qtr >= '2014-Q1' /* COMPOP_GE */
    AND cc_joining_fiscal_qtr <= '2015-Q2' /* COMPOP_LE */
    ) T01 /* Map: Row Source */
GROUP BY state,
    Subscription_Type,              REDUCE: Row Count */
                                    REDUCE: Count Sort */
```

*Fig. 12*

NATURAL LANGUAGE SYSTEM QUESTION CLASSIFIER, SEMANTIC REPRESENTATIONS, AND LOGICAL FORM TEMPLATES

BACKGROUND

The ways in which users interact with computing devices continues to increase. For example, users originally interacted with computing devices using punch cards, which then progressed to use of keyboards, then cursor control devices, and now gestures and user utterances, e.g., natural language systems. For example, desktop computers, mobile phones, game consoles, automobiles, and so forth may now include functionality in which a user may speak or type in a word or phrase to initiate corresponding functionality of the device, such as to send a text, make an appointment, learn about the weather, and so forth.

In order to do so, natural language systems are confronted with the problem of how capture, represent, and respond to a natural language question. Conventional techniques that are used to do so, however, are typically limited to a single dedicated domain (e.g., appointment scheduling) in order to develop a custom knowledge repository or ontology for the tasks that are to be addressed by these techniques, e.g., the appointment scheduling. Accordingly, conventional techniques are not scalable to other domains and often require that a user learn specific phrases in order to interact with the systems, which is inefficient, frustrating, and oftentimes inaccurate due to these limitations.

SUMMARY

Natural language system question classifier, semantic representation, and logical form template techniques and systems are described. In one or more implementations, a digital medium environment is configured to answer a question included in a natural language input. To do so, a natural language input (e.g., typed text or spoken utterance) is classified as corresponding to respective ones of a plurality of classes of questions, such as who, what, when, where, which, why, or how many which is expressed as a question classification label. A semantic intent of the natural language input is extracted as a semantic entity (e.g., person, place, time entities, time units, time period, role entities, or thing entities) and a semantic representation, e.g., a subject, predicate, object tuple that functions as a statement linking the subject to the object via the predicate.

The question classification labels that classify the question included in the natural language input are then used to select at least one of a plurality of logical form templates. The semantic intent that is extracted from the natural language input is then used to fill in the selected logical form template, such as to fill in entity, subject, predicate, and object slots using the semantic entity and semantic representation. The filled-in logical form template is then mapped to form a database query (e.g., a structured databased query such as for MySQL) that is then executed to query a database to answer the question.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 depicts an example of conversion of a natural language question into a filled-in logical form template and from there into a database query.

Figure 11:
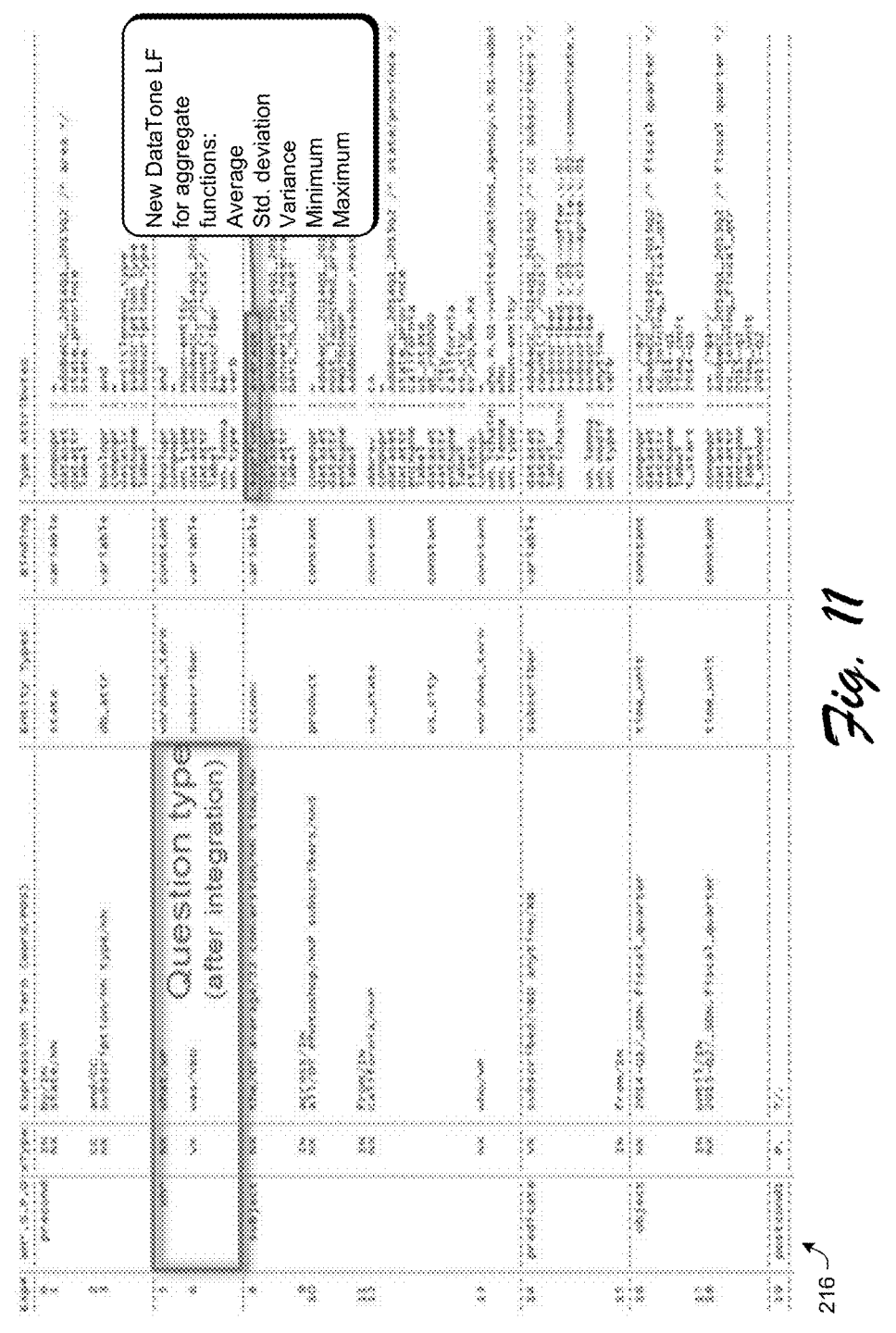

FIG. 11 depicts an example of a filled-in logical form template.

FIG. 12 depicts an example of how a filled-in logical form template is used to generate a database query.

DETAILED DESCRIPTION

Overview

Figure 1:
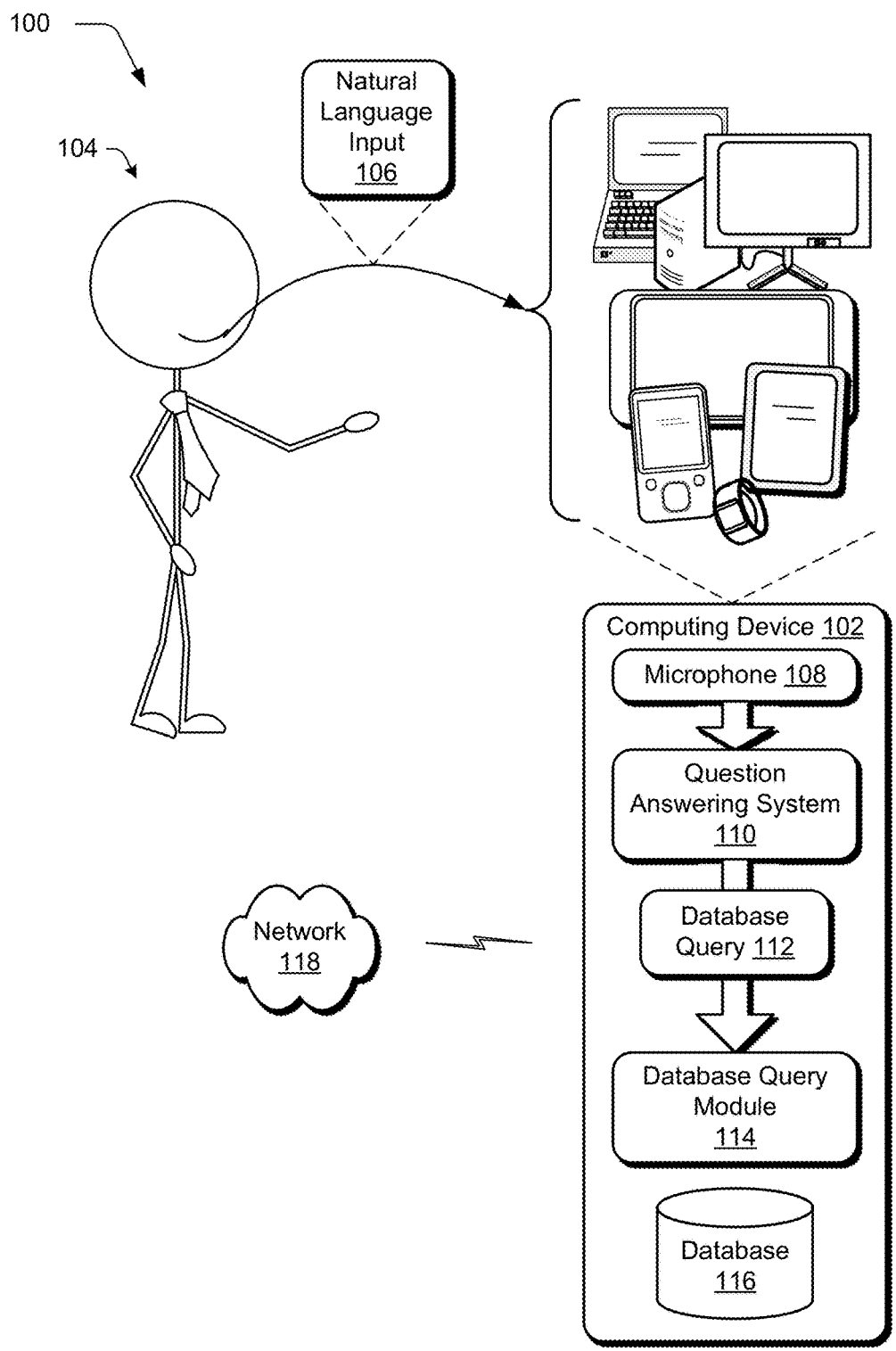
FIG. 1 is an illustration of an environment in an example implementation that is operable to employ natural language system question classifier, semantic representation, and logical form template techniques described herein.

Conventional natural language systems cannot accurately answer general natural language questions, whether about business analytics, to find image or document assets during a search, or to provide help about a product or service. In an attempt to do so, these conventional systems typically rely on a combination of complex graphical user interface experiences, simple keyword-based text search systems, or human technical support.

As part of this problem, conventional techniques are not scalable because these conventional techniques are limited to particular domains. As such, conventional techniques are unable to augment other product user experiences and/or support infrastructures with an intelligent natural language agent because the agent requires that a user learn a set complex interactions for each product or service. For example, conventional systems that support natural language interaction and provide advanced question answering and hypothesis generation generally function for a specific domain such as analytics, medical, financial, scientific, and engineering applications. Additionally, usage is typically limited to a set of specific interactions that are supported for these domains and thus require expert levels of knowledge to perform, which runs counter to an original purpose of providing these systems to make the interaction easier.

For instance, in the above conventional systems, before users can even begin to ask questions, engineers had to acquire both generic knowledge (e.g., concepts around person, place, thing, time), as well as domain specific concepts e.g., business analytics, image or document search, or product-specific help. Additionally, since natural language questions frequently involve nomenclature specific to a domain, a lexicon has to be developed or learned. When human expertise is required, this task may be expensive, tedious and time consuming Accordingly, techniques and systems are described in the following that address a central problem faced by natural language systems. This problem involves how to capture, represent, and respond to a natural language question posed by a user who is interacting with a system to complete an information task, e.g., to answer a question. For example, a natural language question may originate from an analyst that wants to know the number of days it took a customer to convert from being a free trial user to being paid subscriber, a designer who is interested in pictures from an image search system that shows outdoor winter sunset scenes that contain people, or an information worker who needs to locate all recent documents relevant to a business acquisition. Some examples of questions that are capable of being classified and directly answered by the techniques described herein are:

"What was the average conversion time across all software subscribers from California who subscribed anytime from 2014-Q1 until 2015-Q2?"

"Find me all images of outdoor winter scenes that contain people during a sunset."

"Tell me which of my documents are related to the company's acquisition of the start-up company."

These techniques and system include three elements to support a natural language framework that is capable of understanding and responding to natural language questions across different domains. The first element is question classifier involving Wh* question classification (e.g., Wh*=who, what, when, where, which, why, how many) along with a generalized multi-level question type taxonomy that is trained from example questions across a number of domains. Further discussion of this element is described in relation to FIGS. 2-9 in the following.

The second element involves techniques and systems to automatically extract subject-predicate-object tuples (e.g., <Subject, Predicate, Object> semantic "triples") from natural language questions to capture the intent of a natural language question that is robust to various language ambiguities. Further discussion of this element is described in relation to FIGS. 2 and 10 in the following.

The third element involves techniques and systems by which the outputs of the first two stages are used build a semantic knowledge representation of the natural language question intent and then use the WH-* classification and other information to select a best answer "template" that includes attribute/value slots that are then automatically filled in. The filled in template is then used to produce a structured database query, e.g., for database systems like MySQL, Adobe MCDP Sparkle Query Language, and so on which then answers the user's original question. Further discussion of this element is described in relation to FIGS. 2 and 11-14 in the following. The three elements described herein are combinable and/or usable separately to support an ability to understand and answer a large class of natural language questions across a variety of domains with increased accuracy and computational efficiency over conventional techniques.

In the following discussion, an example environment is first described that may employ the natural language techniques described herein. Example implementations and procedures are then described which may be performed in the example environment as well as other environments. Consequently, performance of the example procedures is not limited to the example environment and the example environment is not limited to performance of the example procedures.

Terminology

In the following, "question answering" refers to a computer science discipline within the fields of information retrieval and natural language processing (NLP). This discipline is concerned with building systems that automatically answer questions posed by humans in a natural language.

A "dialog system" is a computer system configured to converse with a human using a coherent conversational structure. Dialog systems have employed text, speech, graphics, haptics, gestures and other modes for communication on both the input and output channel A "natural language dialog system" is a form of a dialog system that attempts to improve usability and user satisfaction by imitating human behavior. It addresses the features of a human-to-human dialog (e.g., sub dialogues and topic changes) and aims to integrate them into dialog systems for human-machine interaction. Conventional dialog systems require the user to adapt to the system because the system is only able to understand a limited vocabulary, is not able to react on topic changes, and does not allow the user to influence the dialogue flow.

In the following, "natural language" involves spoken or written communications using human language typically expressed using written text or from spoke language converted through a Speech-to-Text system.

A process of "Wh-* Classification" involves classification of a natural language question into a "who", "what", "when", "where", "which", "why", or "how many" question.

In the following, an acronym "LF" refers to a logical form of a sentence (or proposition or statement) or set of sentences. The logical form is obtained by abstracting content terms or by regarding the content terms as placeholders or blanks on a form. For natural language sentences, the logical form generally cannot be determined from syntax alone as logical forms are not simply syntax used to represent sentence semantics as there exist generally more than one string representation for the same logical form in a given language.

For a subset of real-world (non-philosophical) questions, a logical form for a question can be constructed by representing the question as a dialog act that requests information constrained by one or more conditional predicates. In the context of the following, a logical form is an attribute value structure, potentially hierarchical, that formally represents the semantics and intention of a natural language statement or a question once it has been classified.

A "<Subject, Predicate, Object>" triple is a representation of a statement where semantics are represented using a 3-tuple that includes a "subject", "predicate", and "object" component, i.e. a statement linking one entity (subject) to another entity (object) via a predicate. A triple is the smallest irreducible representation for a binary relationship. Examples of simple triples include the following:

<Users, subscribed_to, software>;
<Q4-2014, had_the_most, Subscribers>; and
<A man, is_walking, his dog>.

An "ontology" is a hierarchical knowledge representation used to define concepts and topics in a specific domain or area and provides concise relationships between concepts/topics and a constraint language.

In the following, "natural language sentence expression tagging" refers to a tagging process that identifies the clauses or expressions in a natural language input that are noun, verb, or adjective expressions (i.e., NX, VX, or AX) respectively.

"Part-of-speech tagging" refers to a tagging process that identifies a grammatical part-of-speech for each word in a natural language input. For example, part-of-speech for a natural language input "The/DT cat/NN is/VB happy/JJ/." indicate that "The" is a determiner, "cat" is a noun, "is" designates a verb, and "happy" indicates an adjective.

A "structured query language" is an example of a query language for relational databases which includes a "select" clause to indicate information to retrieve, and a "where" clause to indicate the conditions or filters to apply to the information being retrieved. Other examples of languages usable to locate items in a database are described in the following.

Example Environment

FIG. 1 is an illustration of an environment 100 in an example implementation that is operable to employ natural language techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), wearables, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 16.

A user 104 is illustrated as providing a natural language input 106, such as part of a word, full word, phrase, and so on to the computing device 102. The input 106 is shown as being captured by a microphone 108 and provided to a question answering system 110. Although a spoken utterance is illustrated which is then converted to text, the natural language input 106 may also be input via typed text or any other technique usable to input text, examples of which are further described in relation to FIG. 16.

The question answering system 110 is representative of functionality implemented at least partially in hardware (e.g., using a processing and memory system, a system-on-a-chip, and so on) to answer a question contained in the natural language input 106. The question answering system 110, for instance, may form a database query 112 from the natural language input 106 that is usable by a database query module 112 to query a database 118. The database query 112 may take a variety of forms, such as configured in accordance with a structured database that is usable for systems such as MySQL, the Adobe® MCDP Sparkle Query Language, and so on to answer a question contained in the natural language input 106 of the user 104. Through use of the question answering system 110, a learning curve of the user 104 to master a complex user interface or experience is reduced and even eliminated by an ability to address multiple domains and by not being limited to a set of predefined inputs.

Figure 2:
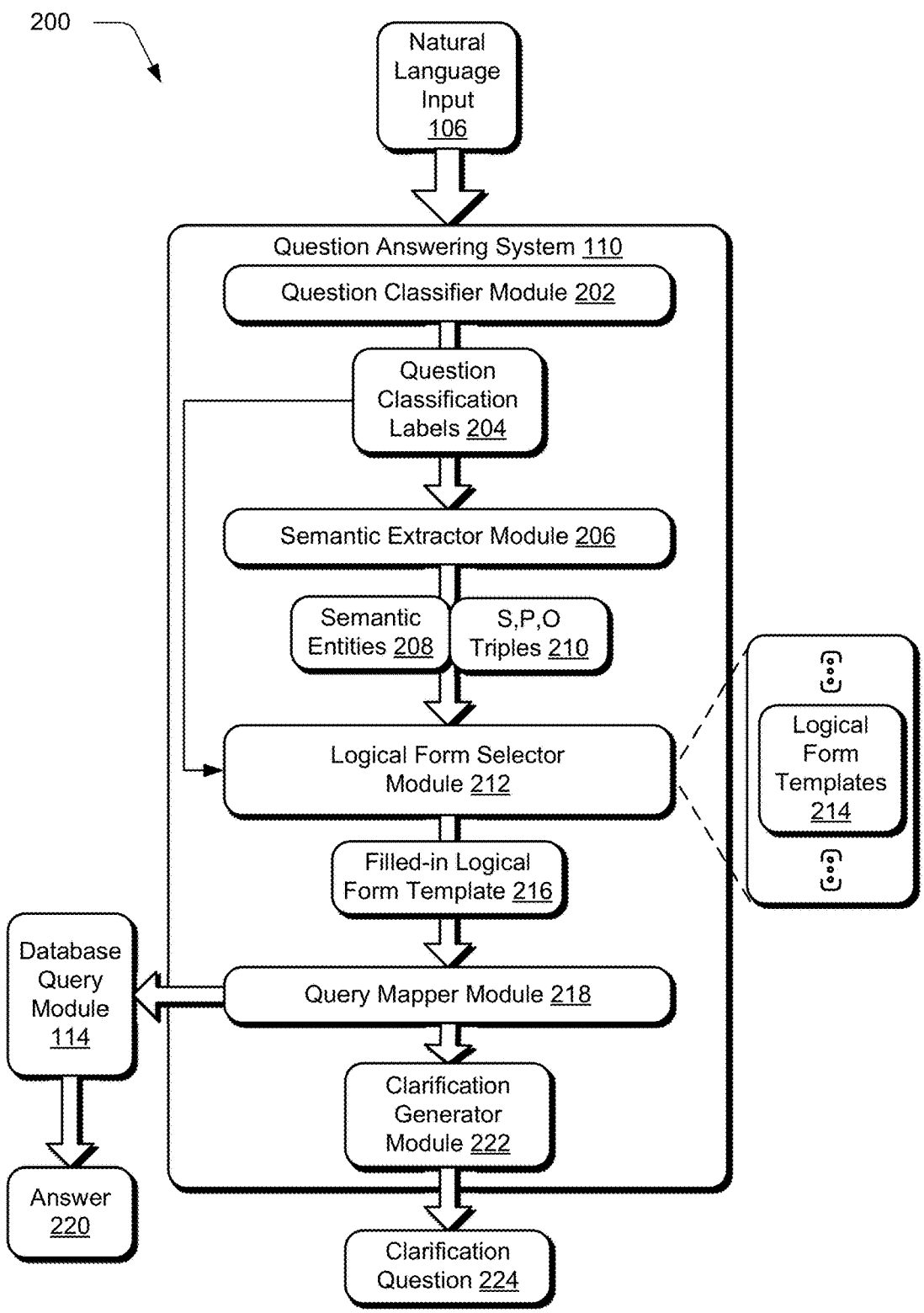
FIG. 2 depicts a system in an example implementation in which a question answering system of FIG. 1 is shown in greater detail.

The question answering system 110 may also support iterative questions and answers that allows the user to obtain accurate results for a given task, such as through use of clarifying questions as described in relation to FIG. 2. Although the question answering system 110 and the database query module 114 and database 116 are illustrated as being implemented by the computing device 102, this functionality may be further divided across a plurality of devices, such as "over the cloud" via a network 118 as further described in relation to FIG. 16. An example of functionality of the question answering system 110 is described in the following.

FIG. 2 depicts a system 200 in an example implementation showing the question answering system 110 of FIG. 1 in greater detail. In the following, a general overview is first provided to introduce components of the question answering system 110. This overview is then following by a detailed discussion of an implementation example involving an example of operation of these components.

Generally, the question answering system 110 first employs a question classifier module 202 that is representative of functionality to generate one or more question classification labels 204. The question classification labels 204 classify a question contained in the natural language input 106 into a respective one or more of a plurality of classes. Examples of classes of questions include "who", "what", "when", "where", "which", "why", or "how many" as described previously.

The question classification labels 204 are formed from a generic question type taxonomy model that is built using machine learning. A machine learning model is first trained using multiple corpora of example questions spanning different question and answer domains and thus is configured to address these different domains, which was not possible using conventional techniques. A variety of machine learning techniques are usable by the question classifier module 202 to train the model to generate the question classification labels 204, examples of which include classifiers and ensemble techniques such as Random Forest, Logistic Regression, L1/L2 Linear SVM, and LSTM neural networks, and Linear SVM with L1 Regularization. The model, once trained, is then used by the question classifier module 202 to generate the question classification labels 204 for the natural language input 106 as further described in relation to FIG. 5.

The question classification labels 204 are then provided to a semantic extractor module 206. The semantic extractor module 206 is representative of functionality to extract and encode a semantic intent of the classified question as semantic entities 208 and subject, predicate, object (S,P,O) triples 210. Examples of semantic entities 208 include person; place; time entities such as dates, time units, and time periods such as fiscal quarters; role entities such as professions; and thing entities such as products, vertical segments, and subscription types.

As previously described, a "<subject, predicate, object>" triple 210 is a representation of a statement where semantics are represented using a 3-tuple that includes a "subject", "predicate", and "object" component. The tuple thus functions as a statement linking one entity (subject) to another entity (object) via a predicate. In this way, a representation is obtained by the semantic extractor module 206 of "what is being asked" in the natural language input 106.

The question classification labels 204 from the question classifier module 202 as well as the semantic entities 208 and S,P,O triples 210 from the semantic extractor module 206 are then provided to logical form selector module 212. The logical form selector module 212 is representative of functionality to select and fill-in a respective one of a plurality of logical form templates 214 based on these inputs. The logical form selector module 212, for instance, uses these inputs to build an internal semantic knowledge representation of the natural language question contained in the natural language input 106.

To do so, the logical form selector module 212 selects the one of the plurality of logical forms 214 as a "template" that includes attribute/value slots based at least in part on the question classification labels 204. The slots of the selected logical form template 214 are then automatically filled-in by the module to capture the semantic intent of the original natural language question of the natural language input 106. For example, the logical form selector module 212 may assign the relevant extracted semantic entities 208 and S,P,O triples to slots in a selected logical form template 214 to generate a filled-in logical form template 216.

The filled-in logical form template 216 is then obtained by a query mapper module 218 of the question answering system 110. The query mapper module 218 is representative of functionality to produce a database query 112 (e.g., a structured database query) which is then used by the database query module 114 to generate an answer 220 to the user's original question that is contained in the natural language input 106. The query mapper module 218, for instance, may map the filled-in logical form template 216 into a structured query that is usable to query relational databases such as MySQL, a query engine in accordance with the MCDP Sparkle Query Language, and so on.

The question answering system 110 is also illustrated as including a clarification generator module 222. This module is representative of functionality to generate a clarification question 224 if parts of the filled-in logical form template 216 are ambiguous or incomplete when mapped to a database query. Having now described operation of the question answering system 110 in general, an implementation example of operation of this system is described in the following section.

Implementation Example

This section presents a detailed description of a workflow of the question answering system 110 of FIG. 2. As shown in an example implementation 300 of FIG. 3, a natural language input 106 is illustrated as "What was the average conversion time across all software subscribers from California who subscribed anytime from 2014-Q1 until 2015Q2?" From this input, a question classifier module 202 produces question classification labels 204, e.g., as a WH-* type classification and sub-classification, the illustrated example of which is "Question type: Numeric-average."

Semantic extractor module 206 and logical form template selector module 212 are then used to select and fill out a logical form template 214 in the following to generate a filled-in logical form template 216 to act as a logical form representation of the question. The query mapper module 218 then translates the filled-in logical form template 216 of the question into a database query 112 that can then be executed by the database query module 114 of FIG. 1 to generate the answer 220.

Question Taxonomy Creation

Figure 4:
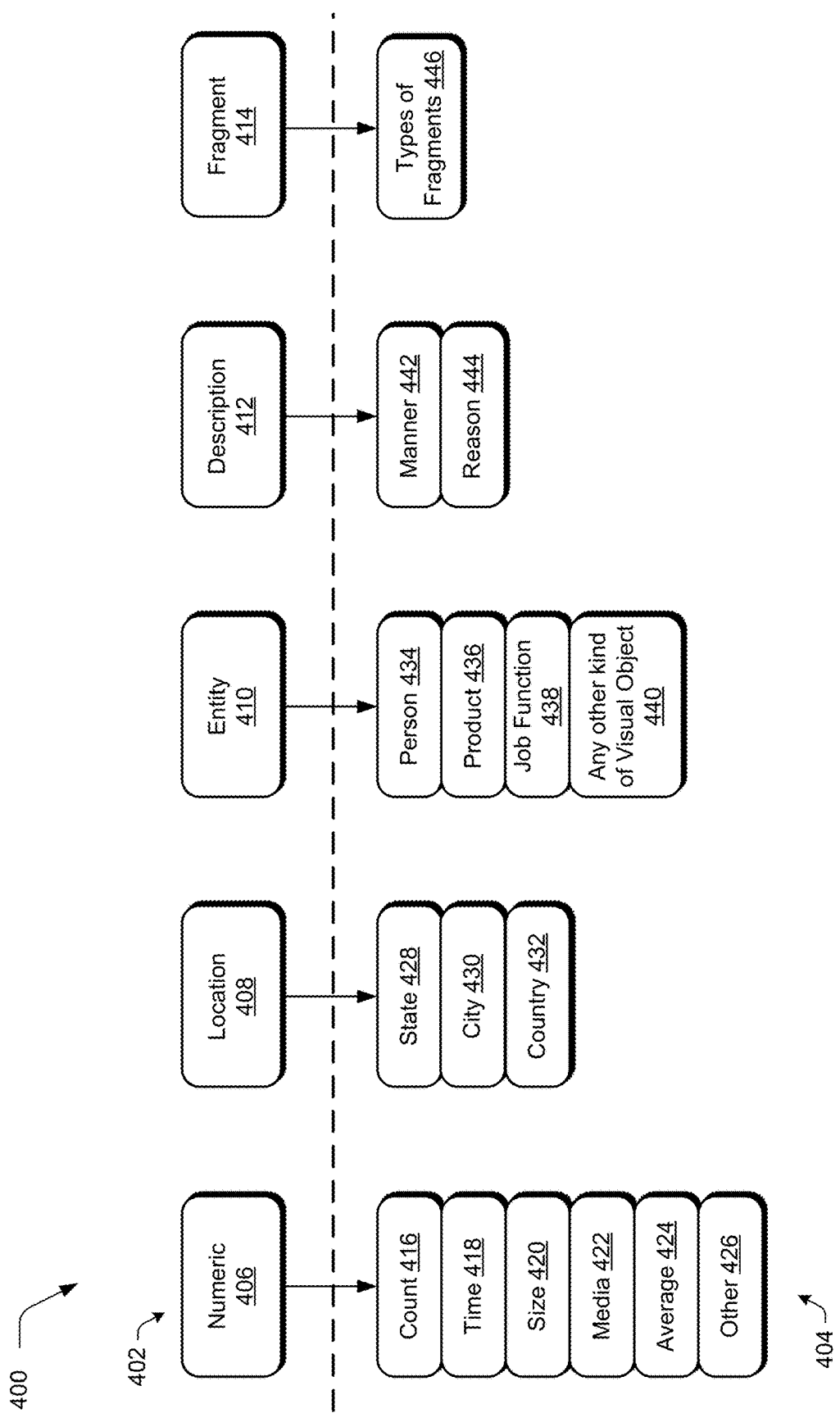
FIG. 4 depicts an example implementation of a type taxonomy that is usable as part of multilevel WH-* question classification.

FIG. 4 depicts an example implementation of a type taxonomy 400 that is usable as part of multilevel WH-* question classification performed by the question classifier module 202. The type taxonomy 400 describes classes used to classify the natural language input 106. The type taxonomy 400 may be manually created or may be created automatically and without user intervention by the question answering system 110 by classifying general patterns of natural language WH-* questions across domains. In the illustrated example, the type taxonomy 400 is multilevel as including first and second levels 402, 404. The first level includes types such a numeric 406, location 408, entity 410, description 412, and fragment 414 types.

Each of these types at the first level 402 includes at least one example of a sub-type in the second level 404, such as count 416, time 418, size 420, media 422, average 424, and other 426 for numeric 406. Location 408 includes sub-types of state 428, city 430, and country 432 and entity 410 includes sub-types of person 434, product 436, job function 438, and any other kind of visual object 440. Description 412 includes sub-types of manner 442 and reason 44 and fragment 414 includes types of fragments 446. Thus, these types may be used to classify a question by the question classifier module 202 using classes and sub-classes arranged across different levels.

A variety of techniques may be employed to create a question taxonomy for defining a second level taxonomy within a first level classification. A first such technique involves learning a subtype lexicon for each first level classification by performing a noun phrase occurrence analysis based on the combined training example sentences and then labeling the training data. When new domains are to be incorporated into the system, this noun phrase occurrence analysis and labeling is repeated for the new domain. A second technique may be used to directly learn a subtype lexicon for each first level classification from a topic ontology.

Feature Extraction

Figure 5:
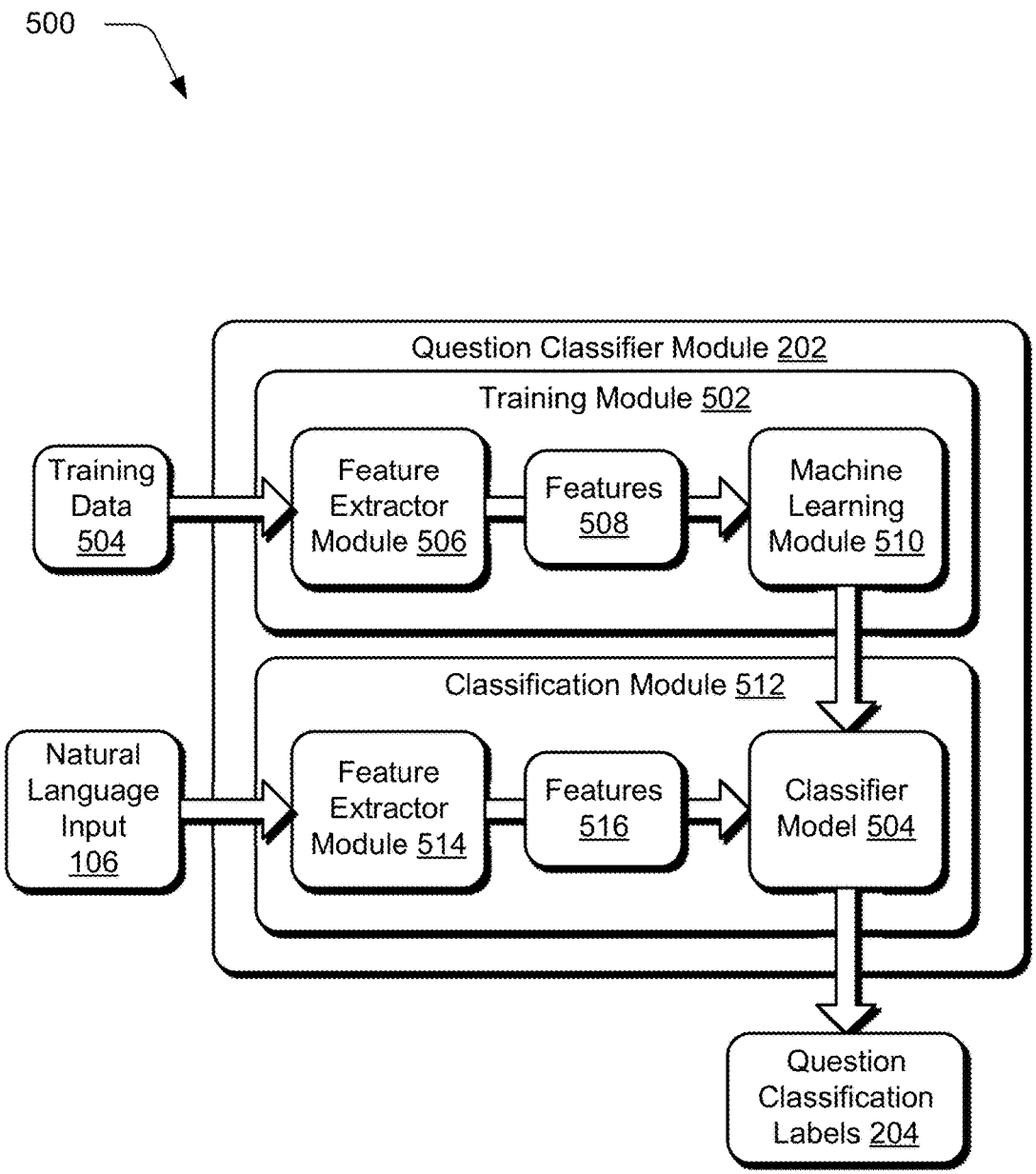
FIG. 5 is an example implementation showing a question classifier module of FIG. 2 in greater detail as performing feature extraction to learn and use a model to classify a question of a natural language input into one or more classes.

FIG. 5 is an example implementation 500 showing the question classifier module 202 in greater detail as performing feature extraction to learn and use a model to classify a question of the natural language input 106 into one or more classes as described above. A training module 502 is included that is representative of functionality to train a classifier model 504. To do so, training data 504 is first obtained, which may include multiple corpora of example questions spanning different question and answer domains and thus is configured to address these different domains.

A feature extractor module 506 is then employed to extract features 508 (e.g., linguistic and semantic features) from the training data 504 that are usable by a machine learning module 510 to generate the classifier model 504. This includes extraction of words and part-of-speech tags, noun and verb expressions, named entities, and <subject, predicate, object> triples as further described below. The features 508, 516 are extractable in a variety in ways, such as by parsing each input sentence as a sequence of noun expressions, verb expressions, and function words.

In addition, feature extraction may also include part-of-speech tagging for each word. Feature extraction may also employ tags that reference semantic information for each noun or verb expression, e.g., whether the word has a subject, predicate, or object role; what is the "head word" of the expression; and an entity type of the expression, which may be represented as a set of hypernym chains in an ontology.

Thus, the features 508 define characteristics of questions that are usable to train the machine learning module 510 to classify the question into a corresponding one of a plurality of classes. A variety of machine learning techniques are usable to train the classifier module 504 as previously described, examples of which include classifiers and ensemble techniques such as Random Forest, Logistic Regression, L1/L2 Linear SVM, and LSTM neural networks, and Linear SVM with L1 Regularization.

The classifier model 504 is then obtained by a classification module 512 for use in classifying subsequent natural language inputs 106, e.g., inputs that were not used to generate the model. Like in training, the natural language input 106 is first processed by a feature extractor module 514 to extract the features 516 that are usable by the classifier module 504 to classify the question into a corresponding one of a plurality of classes and generate question classification labels 204 that indicate these classes.

In one or more implementations, noun instances are abstracted. For examples, noun instances such as "conversion time", "software", "subscribers", "California", "2014-Q1" and "2014-Q2" are abstracted into corresponding generic types of classes <TIME>, <PRODUCT>, <PERSON>, <LOCATION>, <TIME>, and <TIME>, respectively. These abstractions are used as part of the extraction involved in both training and classification as performed by the training module 502 and classification module 512, respectively. Abstraction allows the classifier model 504 to learn generalized question patterns rather than training over millions of labeled example questions containing all possible noun instances and combinations and in this way has increased computational efficiency.

As part of feature extraction, feature representations are built for each word in an input sequence (e.g., the training data 504 and/or the natural language input 106) by concatenating the relevant semantic and syntactic information. Bigram and trigram features are built by concatenating word-level features of consecutive lemmas, i.e. word-level features of the head words of consecutive expressions, as further described below.

Figure 6:
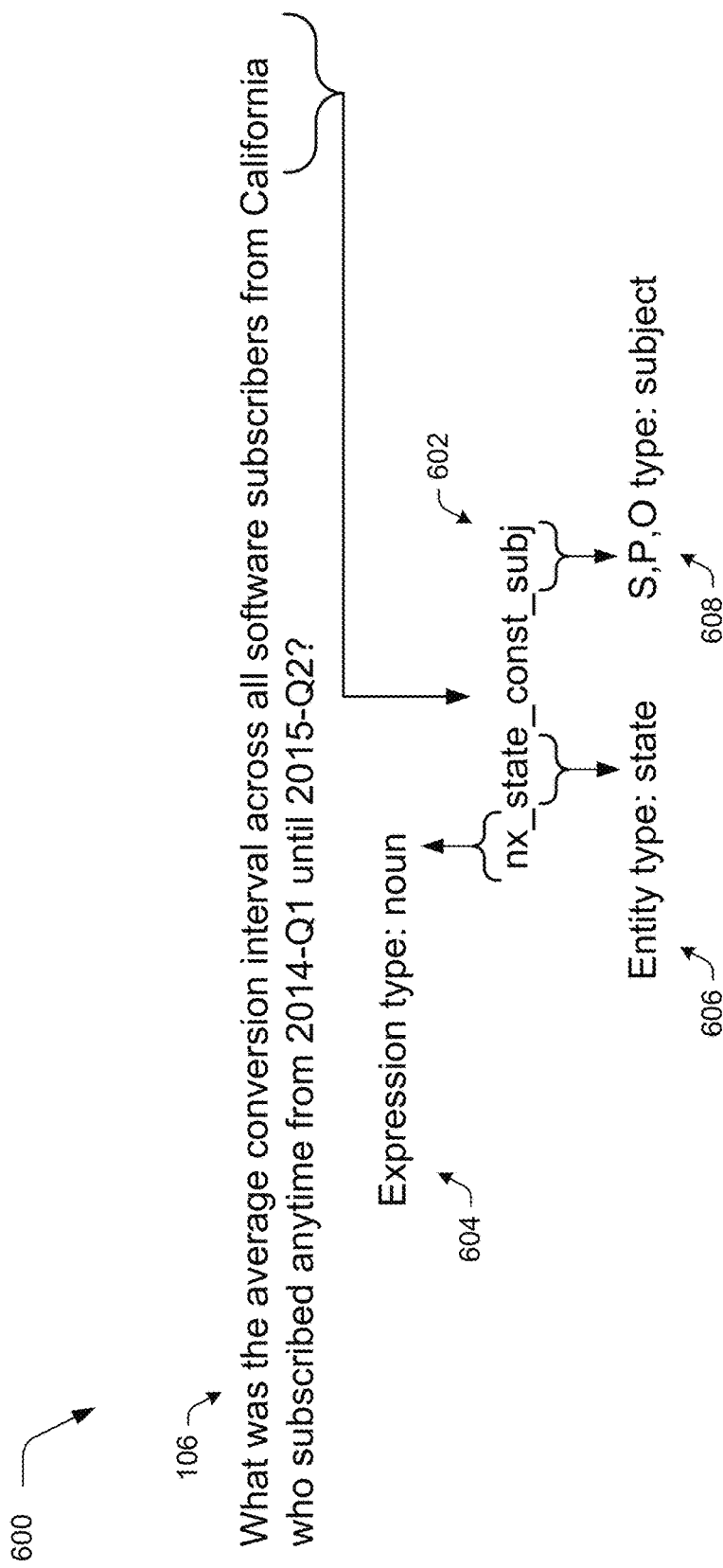
FIG. 6 depicts an example implementation of concatenation of relative information into a feature representation as performed for a head word of each noun or verb expression.

An example of concatenation of relevant information into a feature representation 602 as performed for a head word of each noun or verb expression is shown in an example implementation 600 of FIG. 6. The feature representation 602 includes an expression type 604, e.g., noun, verb, or type of function word. In the case of nouns, the feature representation 602 also includes an entity type 606 (e.g. state), and an S,P,O type 608 (e.g., subject) and thus describes the subject, predicate, or object role of the corresponding word. The feature representation 602 also indicates whether the word is constant or variable, which is constant in this instance as illustrated through use of "const" in the feature representation 602.

Figure 7:
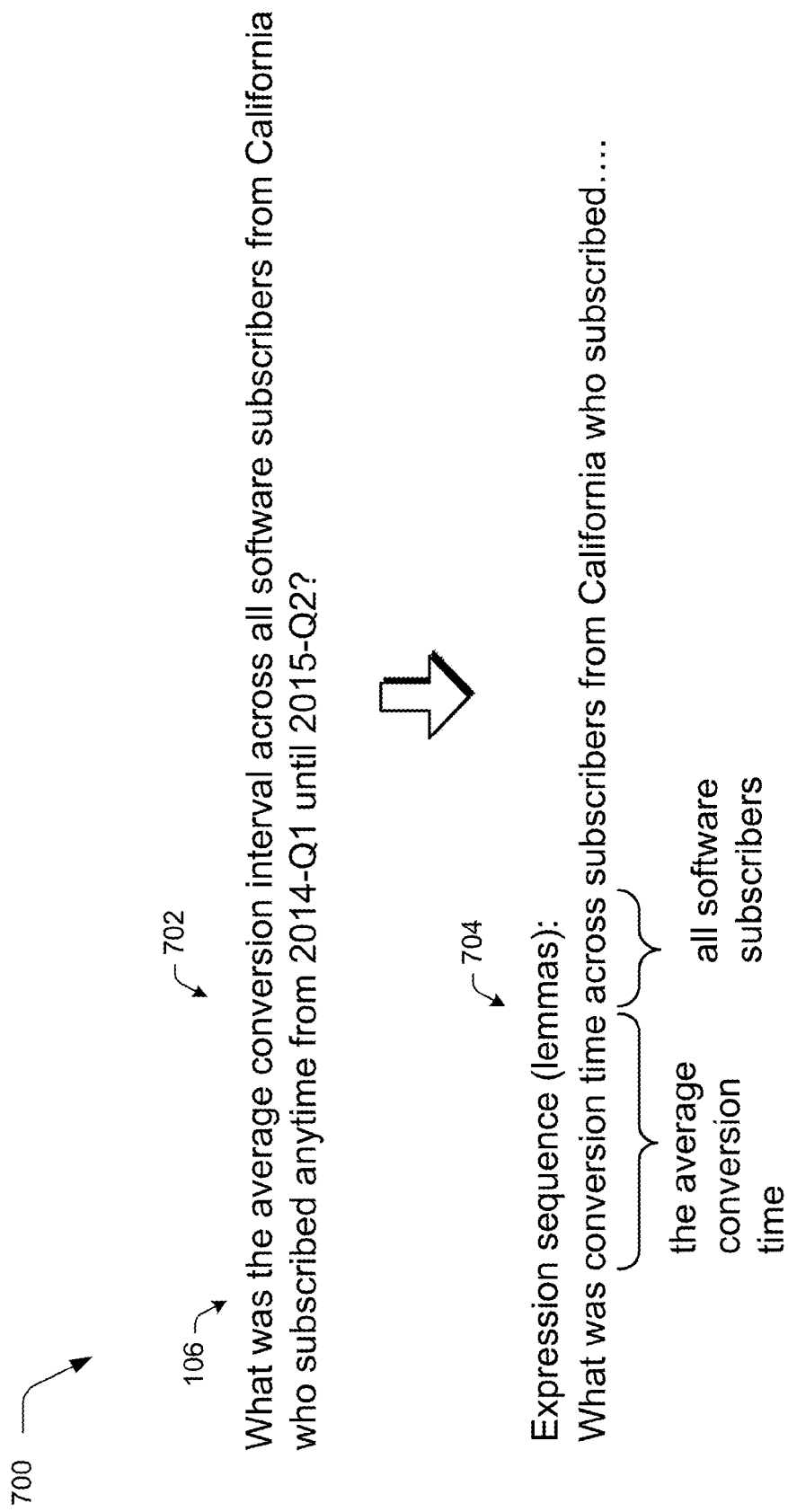
FIG. 7 depicts an example implementation showing concatenation of each expression (i.e., lemma) other than a head word.

FIG. 7 depicts an example implementation 700 of a feature representation of the natural language input 106 as capturing semi-syntactic information. The feature representation in this example is configured as an expression sequence formed as a structure having two levels. The first level is an original input word sequence level 702 of the natural language input 106 and the second level is a lemma sequence level 704, i.e., an expression level of the representation and thus "lemmas" refer to expressions that are included as part of the natural language input.

The lemma sequence level 704, for instance, keeps the links between neighboring lemmas (e.g., expressions) by abstracting away sequences of subordinate words which may mask these links, e.g., by abstracting "the average conversion time" into "conversion time" and "across all software subscribers" into "across." At the original input word sequence level 702, the representation maintains links between each word in this sequence and its lemma at the lemma sequence level 704.

Figure 8:
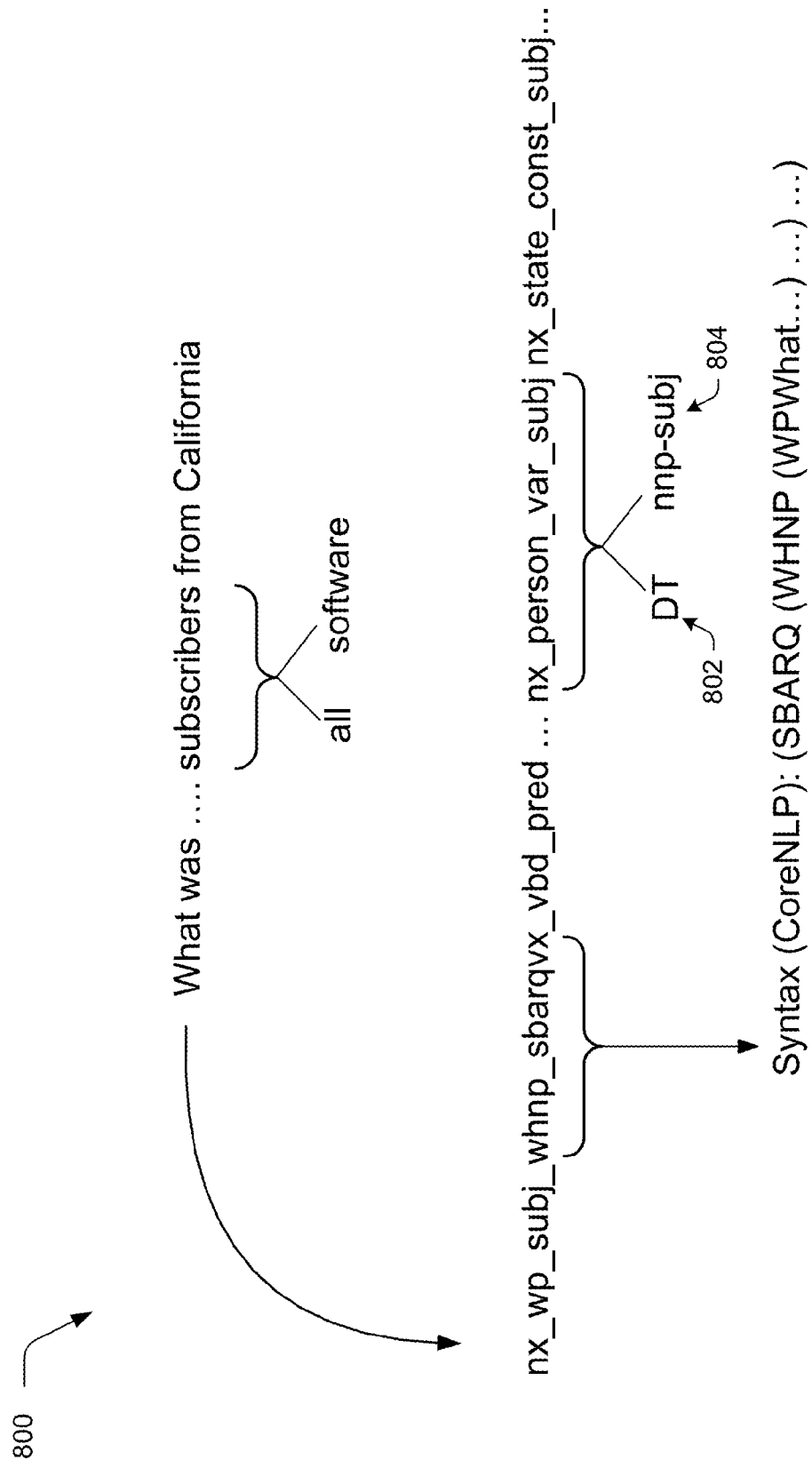
FIG. 8 depicts an example of a subject, predicate, or object role.
Figure 9:
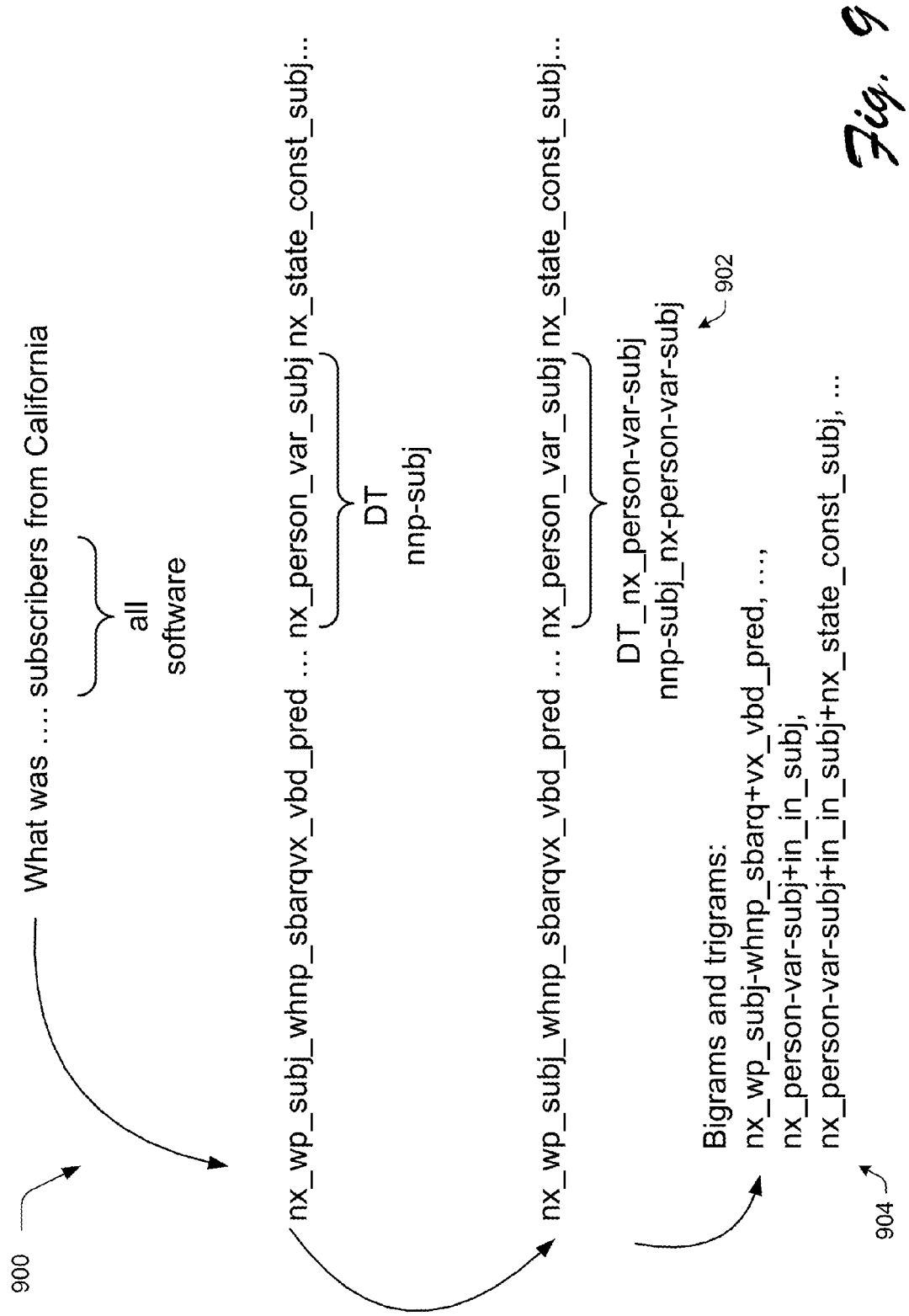
FIG. 9 depicts an example of an indication of a head word to which an expression is attached.

Thus, for each lemma (i.e., expression constituent) other than the head word in FIG. 7, the relevant information to be concatenated is a part-of-speech tag 802 (e.g., nx for noun, dt for determiner, etc.) and if assigned, a subject, predicate, or object role 804 as shown in an example implementation 800 of FIG. 8. The feature representation may also include an indication of the head word 902 to which the expression is attached as shown in an example feature representation 900 of FIG. 9, e.g., "nx_person-var-subj." For adjectives, adverbs, and WH* words, lexical information is preserved in that the actual words are used instead of the part-of-speech tags.

Additional syntactic features may be considered for inclusion as part of the representation that rely on Stanford Core NLP and include "WH*-SBAR" paths in a derived parse tree for the input question. This information may be added at the end of the word-level feature representation. WH* tags represent the type of WH* phrase that the WH* word is a part of, whereas the S* tags of the Stanford Core NLP represent the subordinate, question, or inverted declarative sentence of which the WH* is a part.

The feature representation 900 captures these links by concatenating consecutive lemma features into bigram and trigram features 904 and concatenating the word-level representations of head words and expression constituents. In this way, the feature representation preserves the links between a lemma sequence and an original sequence.

Returning now to FIG. 5, the WH-* question classifier module 202 uses the learned classifier model 504 trained using the feature representations described above. The feature representations 516 are also extracted from the natural language input 106 for use by the classifier model 504 and returns a result that includes the top "N" most likely question classification labels 204 and associated probability for the natural language input 106. Several classifiers may be used, such as Logistic Regression, Random Forest, and Linear SVM (support vector machines). Thus, the question classifier module 202 provides a mechanism for accepting a spoken or typed natural language question and extracting linguistic and semantic features (e.g., semantic entities and S,P,O triples) as part of a natural language pipeline.

Through this configuration, the question classifier module 202 supports a variety of advantages over conventional techniques. These advantages include an ability to select and exploit features from different natural language processing frameworks that employ the different types of linguistic and semantic features. In testing, a combination of selected natural language features described above that are used to construct feature vector for classifier training achieved a high WH-* classification accuracy as exhibited by a 96% F1 Micro score, which is a standard classifier accuracy measure.

The question classifier module 202 is also able to handle simple and complex question structure. For example, the multi-level structure described above may be used as part of training using both simple and complex questions over several domains, thereby allowing a top-level classifier to be trained and built once without training for each newly encountered domain. The question classifier module 202 can then be rapidly trained as desired from further domain-specific examples, or in a best mode, can learn WH-* sub-classifications from a given domain lexicon or by using a developed and robust method of learning topic classifiers from general ontologies.

The question classifier module 202 is also able to handle WH-* masking and common misclassifications. In this way, the linguistic and semantic features used are robust to WH-* words or phrases that frequently mask the true WH-* classification and confuse other simpler WH-* classifiers. In particular, because the question classifier module 202 uses both linguistic (e.g., N-gram and part-of-speech) semantic features such as the parent types of any extracted semantic entities (e.g., person, place, or thing), WH-* classification masking can be largely reduced. For example, a natural language input "What state had the most CC subscribers?" is properly classified a "where" question and not a "what" question. In another example, a natural language input "Which quarter had the fewest Illustrator subscribers?" is properly classified as a "when" question and not a "which" question using the techniques described above.

<Subject, Predicate, Object> Triple Extraction

Figure 10:
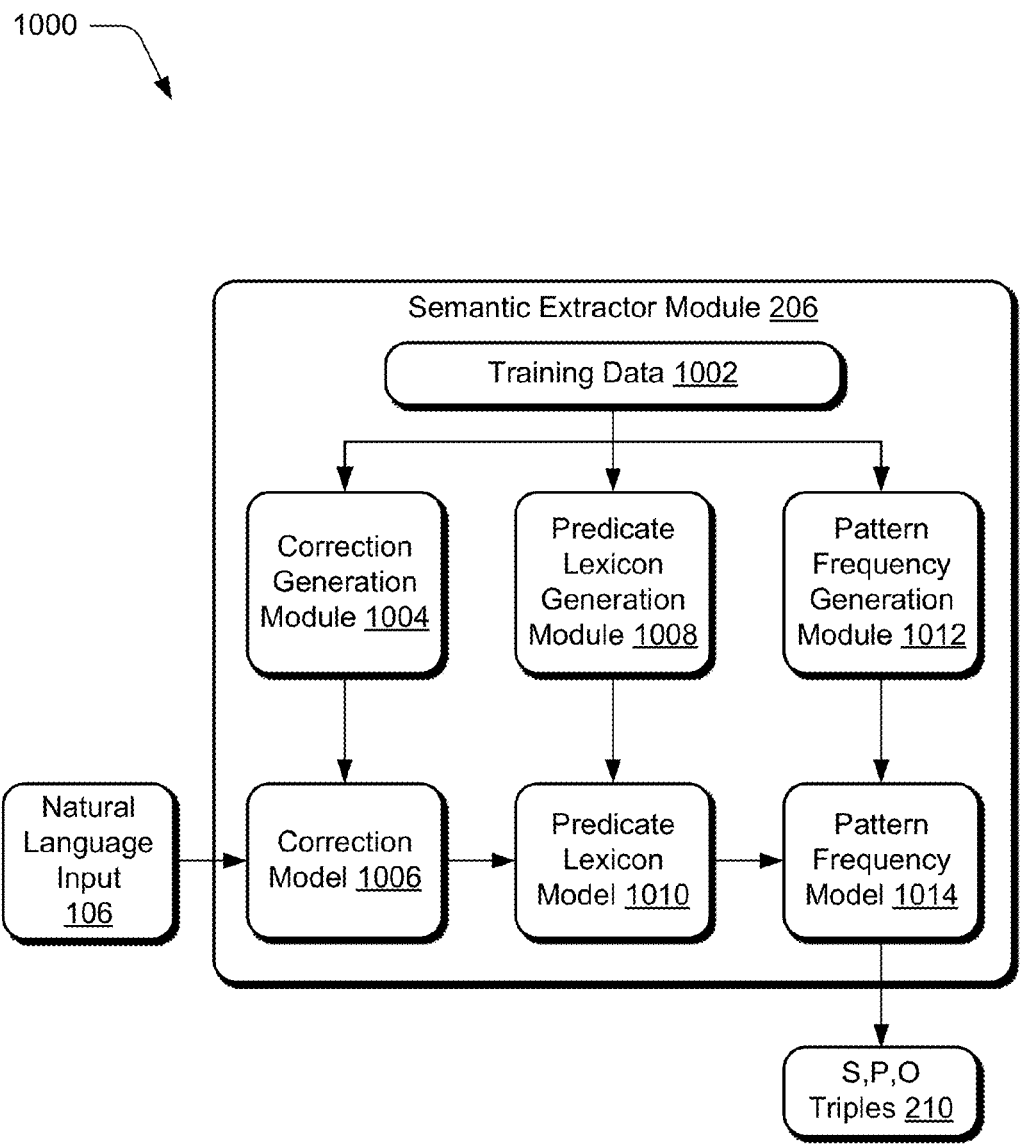
FIG. 10 depicts an example implementation in which a semantic extractor module of FIG. 2 is shown in greater detail.

FIG. 10 depicts an example implementation 1000 in which the semantic extractor module 206 of FIG. 2 is shown in greater detail. The semantic extractor module 206 is configured to perform automatic extraction of <Subject, Predicate, Object> triples 210 from a natural language input 106. This allows actual semantic question intent and constraints and conditions to be accurately captured. This is performed in the following by using a combination of machine learned and heuristic algorithms, which is represented by the semantic extractor module 206 in the figure.

To learn a robust set of <S,P,O> triples extraction algorithms are used during feature extraction for classifier training and used during new question input processing. The semantic extractor module 206 uses a natural language pipeline that performs sentence segmentation, word tokenization, N-gram extraction, named entity recognition/extraction, part-of-speech tagging, speech phrase tagging (for noun, verb, and adjective expressions), and natural language sentence parsing. There are two phases to this process. In the first phase, example natural language sentences and questions are collected and analyzed using correction, tokenization, part-of-speech tagging, and noun/verb (NX/VX) tagging in order to build three statistical models.

To do so, the semantic extractor module 206 first obtains training data 1002 that includes example sentences and questions. The training data 1002 is then processed by a correction generation module 1104 to train a correction model 1006 that is usable to correct errors in the natural language input. Examples of such errors include word, N-gram, punctuation errors, sentence, segmentation, spelling, typographical errors, and so forth. The correction model 1006 is trained through use of a statistical distribution model that is created by counting N-gram and word occurrences to detect common text errors. Statistics on common punctuation errors (missing or incorrect punctuation) are also recorded by this model.

A predicate lexicon generator module 1008 is also employed by the semantic extractor module 206 to generate a predicate lexicon model 1010. The predicate lexicon model 1010 is configured to compute a vocabulary distribution for verb predicates and prepositions to form a lexicon of these phrases for use in the "predicate" slot of each "S,P,O" extraction.

The semantic extractor module 206 also includes a pattern frequency generation module 1012 that is representative of functionality to generate a pattern frequency model 1014. This is performable through creation of a statistical distribution model by counting each occurrence of phase annotation patterns that include of noun, verb, and adjective phrases.

These three models are then used to correct errors in the training and input text, annotate predicate verbs or preposition phrases, and form a set of subject, predicate, and object extraction rules used during triple extraction, respectively. For the correction and predicate lexicon models 1006, 1010, learned extraction rules are combined with a greedy default heuristic used when no extraction rules are available. The default heuristic is a greedy algorithm that uses the first verb expression encountered as the <S,P,O> predicate. The semantic extractor module 206 may also be configured to correct systematic natural language processing part-of-speech tagging and annotation errors introduced by ambiguous nouns, past participles, dialog act directives, existential clauses, and auxiliary verbs.

Through this configuration, the semantic extractor module 206 supports a variety of advantages over conventional techniques. For example, the semantic extractor module 206 is configured to extract informative semantic entities for logical form slot filling. The semantic extractor module 206 achieves robust coverage of semantic entities and their hypernym type chains by using built-in lexicon ontologies and ontology extensions. This provides higher accuracy and completeness during the logical form form-filling task. The semantic extractor module 206 also supports significantly higher <S,P,O> triple extraction accuracy rates by machine learning a language model using sentence and question examples and then deriving top-level <S,P,O> parse rules for the most frequent predicate verb pivot patterns and prepositional patterns.

Semantic <S,P,O> Logical Form (LF) Representation of NL Question

As previously described, the question classifier module 202 produces a question type classification that is used to select an appropriate set of candidate <S,P,O> logical form templates 214. These candidate logical form templates 214 can be ranked using a number of techniques, such as completion of logical form slot-filling, alignment of named entity types in the natural language question to expected entity types in the logical form, and so on. Once ranked, the logical form selector module 212 selects the logical form template 214 with the highest score and the logical form is filled.

The logical form templates 214 are configured to encode each of the semantics of the original question in the natural language input. To do so, the logical form templates 214 capture <S,P,O> triples, named entities and their types, corresponding attributes for the target structured query language, and any additional syntax usable to specify Boolean predicates that constrain the target query. A semantic logical form of the logical form templates 214 includes of the following top-level slots.

Pre-Condition

A pre-condition slot captures attributes used to aggregate, group or cluster the query results. For example, geographic state and subscription type are pre-conditions on how the answer is to be organized.

Wh* Classification

WH-* classification slot captures the 1 or 2-level classification of the natural language input question, e.g., who, what, when, where, which, how many Subject The subject slot specifies the top-level main topic of interest that the question is asking about. Subject elements may be complex and may nest using standard triple reification techniques and may also include any number of prepositional phrases. Examples of such phrases include "the number of CC customers from California", or "the average conversion time(+across all software subscribers, from California)" which specify a subject of interest.

Predicate

The predicate slot captures the primary verb action or, in the absence of a verb, the primary prepositional relationship for the top-level triple, e.g., "purchases" or "subscribed anytime from."

Object

The object slot is used to specify the top-level main object or constraint of interest that is being acted upon by the subject in the case when the predicate slot is a verb expression (VX), or in the case where the predicate is prepositional expression that forms a constraint on a subject. Object elements may be complex and may nest using triple reification methods and may also include any number of prepositional phrases, e.g., "a copy of software", or "the time period between Q1-2014 and Q2-2015".

Post Condition

The post condition slot specifies additional result constraints that rank or order the query result based on natural language directives. Both Pre- and post-conditions serve to control how the question answer is presented.

Since "S,P,O" triples may include empty slots, logical form slots may also be empty. A simplified example "S,P,O" logical form is shown below for a simple natural language question:

"For each state, how many CC subscribers were added as new customers?"

| Pre-Condition: | for each state, | TYPE: GEO |
|---|---|---|
| WH-* Type: | how many | |
| Subject: | CC subscribers | TYPE: PERSON |
| Predicate: | were added as | TYPE: VERB EXPRESSION |
| Object: | new customers | TYPE: PERSON |

The example above shows how words and terms in the simple natural language question are mapped into the logical form template. Returning back to the original more complex natural language question example about average conversion time for software subscribers, (which could include other statistical functions), the question answering system 110 expands and generalizes the type system associated with named entities and then provides an <S,P,O> logical form template 214 that can encode increasingly complex natural language questions. An example of a filled-in logical form template 216 (i.e., a fully slot-filled <S,P,O> logical form template) for the original natural language question is shown in an example implementation of FIG. 11.

The illustrated example filled-in logical form template 216 shows use of a natural language to domain-specific function mapping lexicon that assists the logical form slot filling process in selecting and using the appropriate aggregate statistical function for the stated natural language concept in the original natural language input 106. In this case, "average (or mean) conversion time" results in the identification and use of the statistical average function for structured query generation and subsequent execution against an analytics database, although other aggregate statistical functions may also be used such as min( ), max( ), mean( ), sample and population standard deviation, sum( ), and percentile( ) functions.

Automatic Translation of <S,P,O> Logical Form to a Target Structured Query Language Once the initial logical form slot filling task is completed, the question answering system 110 makes a determination as to whether the filled-in logical form template 216 is sufficiently complete, or if critical fields are missing or ambiguous. In the case of missing or ambiguous information, the question answering system 110 solicits the needed information from the user or infer the appropriate values to use from the user's prior history or history of similar users through use of the clarification generator module 222.

Otherwise, if the filled-in logical form template 216 is deemed "complete", the question answering system 110 involves the query mapper module 218 to create the database query 112 as the structured query instance that is executed by the database query module 114 (e.g., an analytics, search, or other information retrieval engine) to produce and format the data result that answers the original natural language question of the natural language input 106.

Logical form to database query 112 translation is performed by the database query module 114 by traversing the logical form structure and creating a structured query graph using the logical form slot elements and relationships between slots. FIG. 12 depicts an example of how the filled-in logical form template 216 is used to generate a database query 112 (e.g., a MySQL query) by translating the logical form data structure into a 2-level nested SQL query that sources the result rows in the inner "SELECT," then applies "GROUP BY" and "ORDER BY" operators to group and sort the results. Aggregate functions such as average are automatically generated (e.g., avg(DAYS_TO_CONVERT)).

Thus, the question answering system 110 is configured to capture and models the "intent" of a natural language question. The outputs of the first two stages concisely build an internal semantic knowledge representation of the natural language question by combining the WH-* classification, root subject, predicate verb or preposition, and object elements of the top-level <S,P,O> triple.

The logical form to database query techniques described herein have numerous advantages over conventional techniques. In one example, these techniques map diversity of natural language questions to an actionable template, selects the best matching logical form answer "template" for capturing the semantics of the natural language question, and provides a structured mapping from the filled-in logical form templated 216 to an executable database query 112 while capturing and conveying constraint predicates during query execution.

In another example, the techniques are configured to perform automatic semantic frame slot-filling The regularized <S,P,O> slot structure of the logical form eliminates the need for numerous ad hoc slot filling rules and increases generality when logical form templates are extended or new logical form templates are introduced. Thus, logical form slot filling may rely solely on the <S,P,O> extractor. Complex <S,P,O> extractions can be handled recursively or by use of a dependency parser.

Another advantage of the natural language to semantic <S,P,O> logical form approach described herein is that WH-* questions may be captured and represented independent of a target database or search system. Therefore, once a logical form has been slot-filled, modules can be written (or generated) once for many different structured query languages and thus support use with a variety of different database query modules 114. Examples of database query module 114 structured query languages include MySQL, MCDP Sparkle Query Language, and a Site Catalyst query language.

Executing the Structure Query

Figure 13:
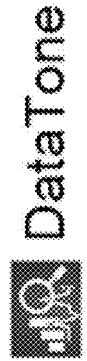
FIG. 13 depicts an example of an answer result as a table of average days-to-convert for each paid subscription type.
Figure 14:
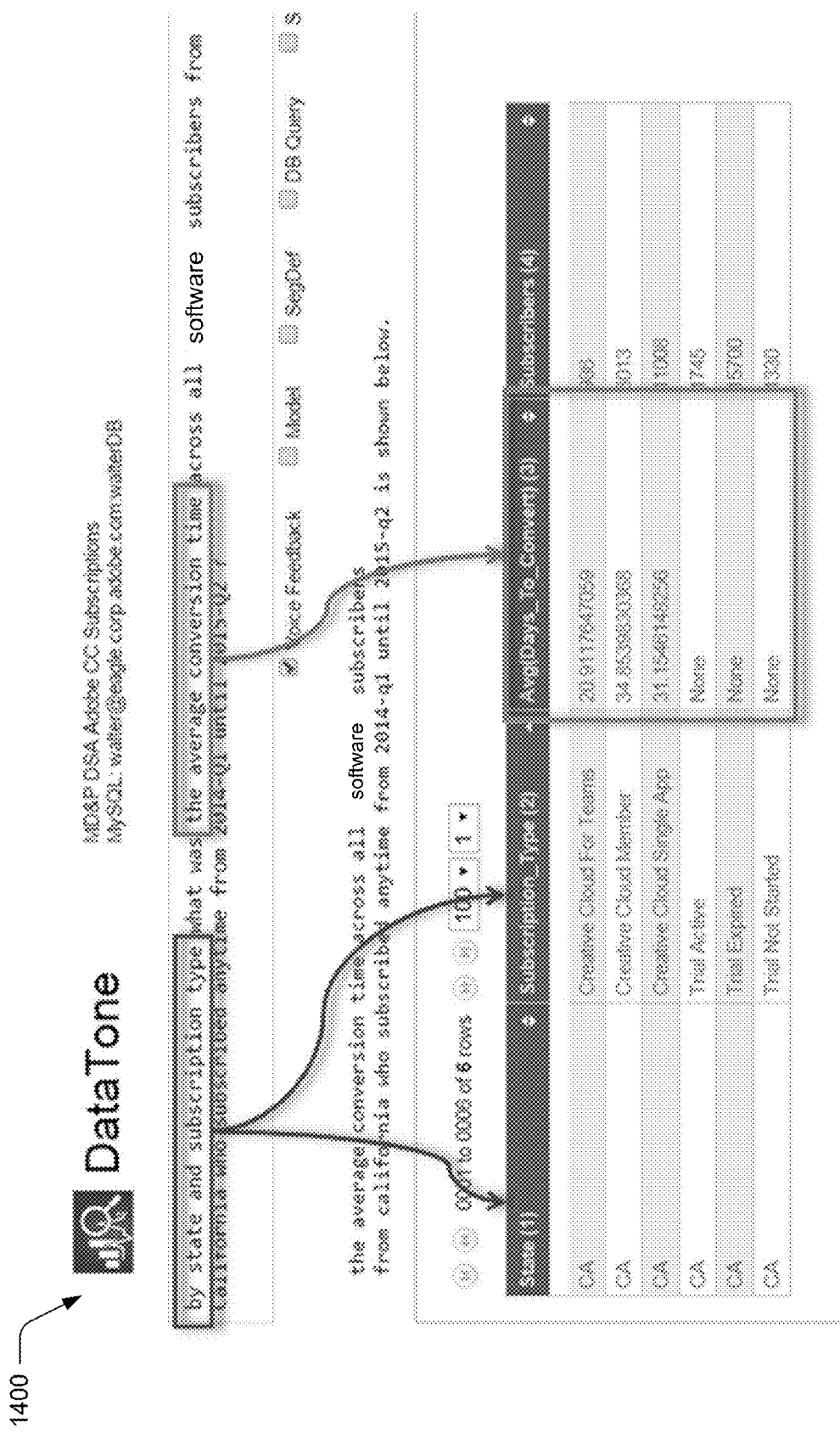
FIG. 14 depicts a mapping of natural language dimensions of interest to structure query attribute or column names for the example of FIG. 13.

The final stage of processing of the question answering system 110 involves the query mapper module 218 submitting the database query 112 to the database query module 114 to execute the query. The results from the query are formatted and then presented back to the user. FIG. 13 depicts an example 1300 of an answer result 1300 as a table of average days-to-convert for each paid subscription type and FIG. 14 depicts a mapping 1400 of natural language dimensions of interest to structure query attribute or column names for the example of FIG. 13.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-14.

Figure 15:
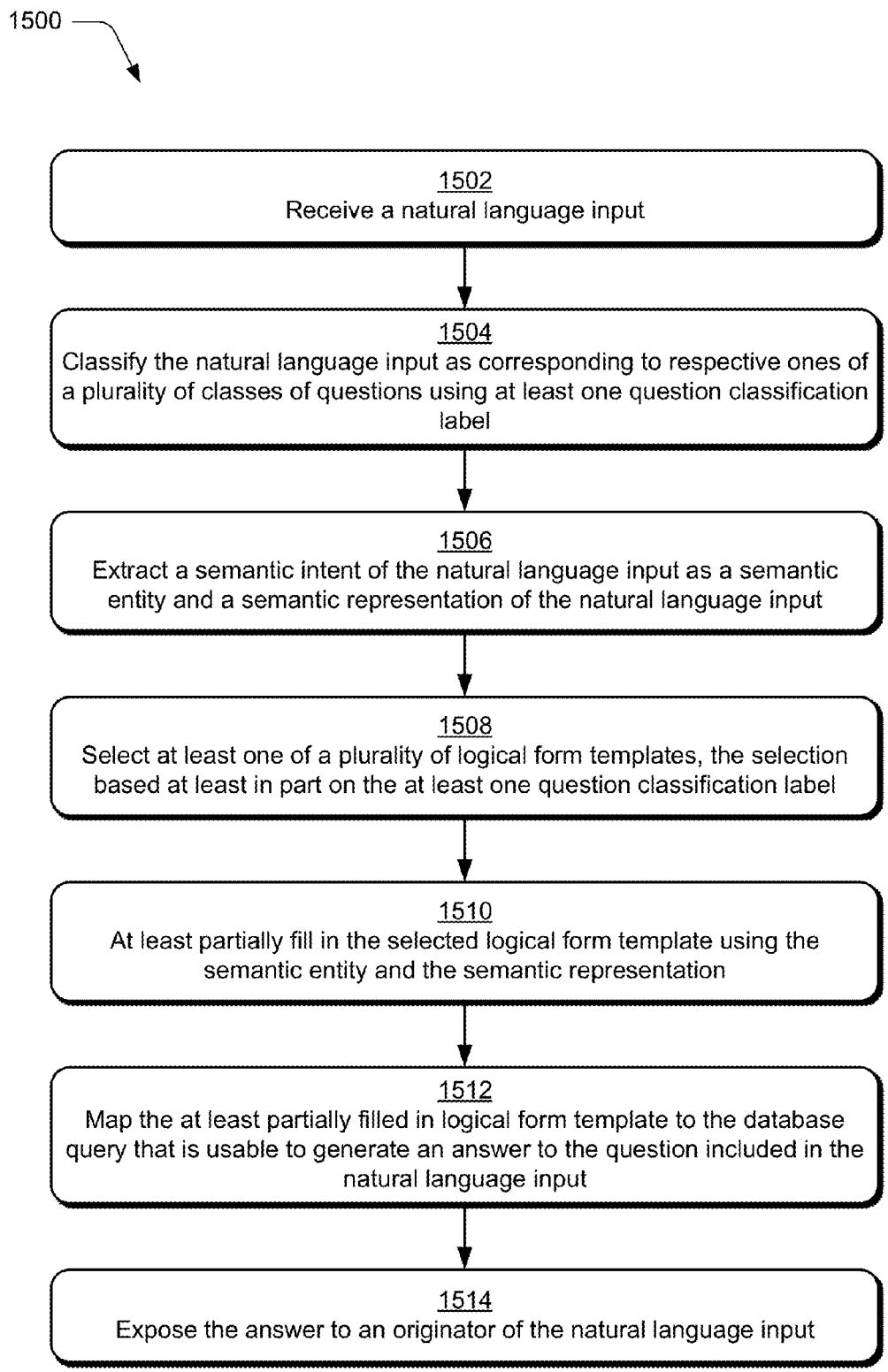
FIG. 15 is a flow diagram depicting a procedure in an example implementation to employ natural language system question classifier, semantic representation, and logical form template techniques.

FIG. 15 depicts a procedure 1500 in an example implementation to employ natural language system question classifier, semantic representation, and logical form template techniques. A natural language input is received (block 1502), such as typed-in by a user, a spoken utterance that is translated using speech-to-text, and so forth.

The natural language input is classified as corresponding to respective ones of a plurality of classes of questions using at least one question classification label (block 1504). The question classifier module 202, for instance, may employ a classifier model 504 to classify a natural language input 106 into a respective class, e.g., who, what, when, where, which, why, or how many.

A semantic intent of the natural language input is extracted as a semantic entity and a semantic representation of the natural language input (block 1506). Examples of semantic entities include person; place; time entities such as dates, time units, and time periods such as fiscal quarters; role entities such as professions; and thing entities such as products, vertical segments, and subscription types. A semantic representation is formable as a "<subject, predicate, object>" triple, which is a representation of a statement where semantics are represented using a 3-tuple that includes a "subject", "predicate", and "object" component. The tuple thus functions as a statement linking one entity (subject) to another entity (object) via a predicate.

At least one of a plurality of logical form templates is selected based at least in part on the at least one question classification label (block 1508). The selected logical form template is at least partially filled in using the semantic entity and the semantic representation (block 1510). The logical form selector module 212, for instance, is representative of functionality to select and fill-in a respective one of a plurality of logical form templates 214. The logical form template 214 is selected based on question classification labels 204 and filled in using the semantic entities 208 and S,P,O triples 210.

The at least partially filled in logical form templated is mapped to a database query that is usable to generate an answer to the question included in the natural language input (block 1512). For example, a structure of the filled-in logical form template 216 may be used to define a corresponding structure in a database query 112 with the filled in values used as values in the query.

The answer is exposed to an originator of the natural language input (block 1514). The question answering system 110, for instance, may expose the answer 220 graphically in a user interface, employ text-to-speech to form an utterance that includes the answer 220, and so on. Thus, the question answering system 110 is usable to answer questions in a natural language input 106.

Example System and Device

Figure 16:
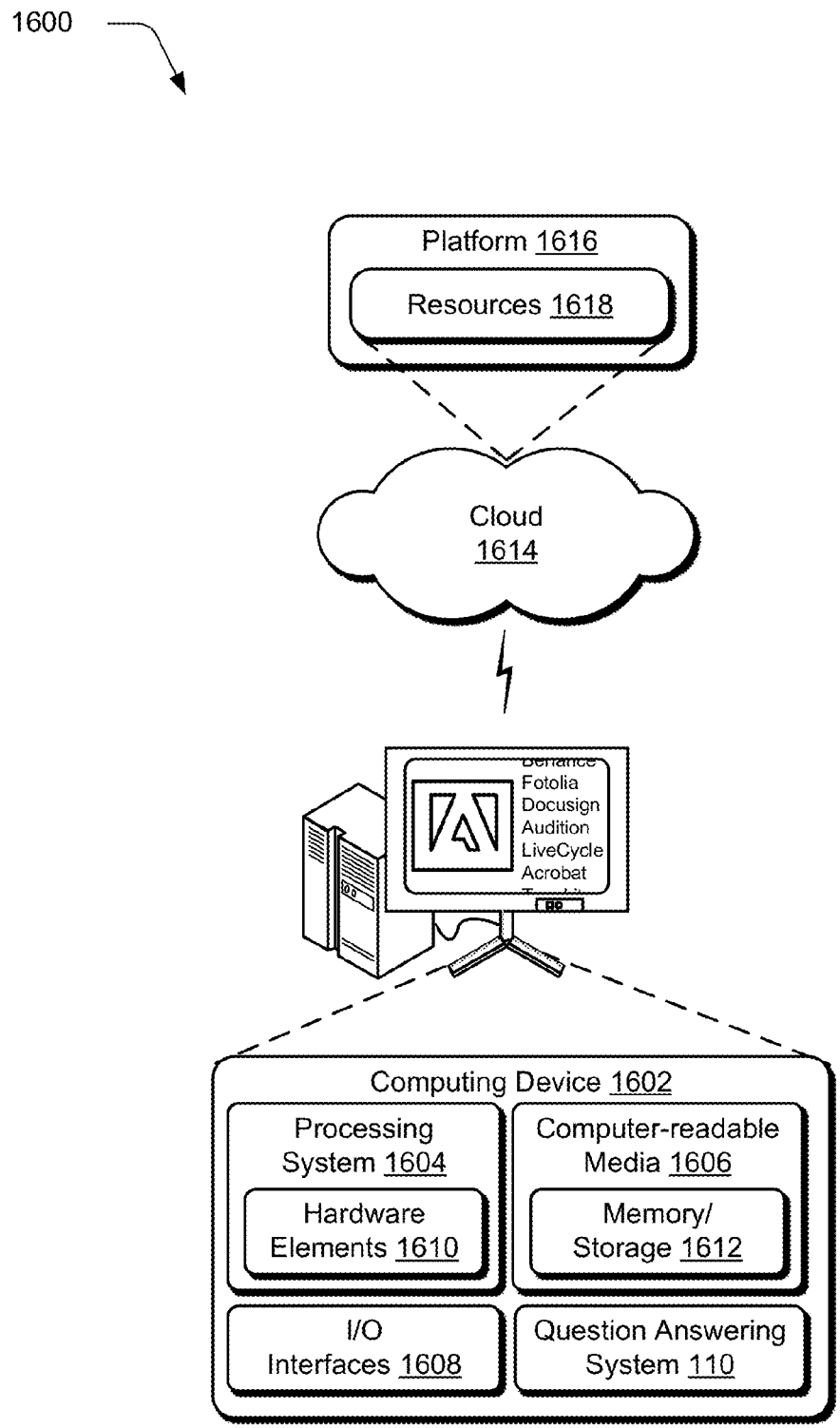
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the question answering system 110. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to answer a question included in a natural language input, a system implemented by at least one computing device, the system comprising:
   a question classifier module implemented at least partially in hardware to classify the natural language input as corresponding to respective ones of a plurality of classes of questions using at least one question classification label;
   a semantic extractor module implemented at least partially in hardware to extract a semantic intent of the natural language input as a semantic entity and a semantic representation of the natural language input;
   a logical form selector module implemented at least partially in hardware to:
      select a plurality of logical form templates, the selection based at least in part on the at least one question classification label;
      rank the plurality of logical form templates based on an amount of completion of logical form slot-filling and alignment of named entity types in the natural language input to expected entity types in the logical form templates;
      select one of the logical form templates based at least in part on the rank; and
      at least partially fill in the selected one of the logical form templates using the semantic entity and the semantic representation;
   a query mapper module implemented at least partially in hardware to produce a database query by mapping the at least partially filled in logical form to the database query, the at least partially filled in logical form including:
      a pre-condition slot containing a first attribute that controls grouping of results of the database query;
      a post-condition slot containing a second attribute that constrains an order of the results of the database query; and
      a slot populated with an indicator of a statistical function selected based on the natural language input from a plurality of available statistical functions; and
   a database query module implemented at least partially in hardware that generates an answer to the question included in the natural language input by executing the database query against a database structured in accordance with a structure of the database query, the answer providing user assistance by responding to the question.

2. The system as described in claim 1, wherein the plurality of classes of questions include who, what, when, where, which, why, or how many.

3. The system as described in claim 1, wherein the question classifier module is configured to perform the classification using a multi-level question type taxonomy that is trained from example questions across a plurality of domains.

4. The system as described in claim 1, wherein the semantic extractor module is configured to extract the semantic intent automatically and without user intervention through use of one or more models that are configured to address language ambiguities contained in the natural language input.

5. The system as described in claim 1, wherein the semantic entities include person, place, time entities, time units, time period, role entities, or thing entities.

6. The system as described in claim 1, wherein the semantic representation is a subject-predicate-object tuple that functions as a statement linking a subject of the subject-predicate-object tuple to an object of the subject-predicate-object tuple via a predicate of the subject-predicate-object tuple.

7. The system as described in claim 1, wherein the selected one of the logical form templates includes attribute/value slots that are filled in using the semantic entity or semantic representation.

8. The system as described in claim 1, wherein the query mapper module is configured to map the at least partially filled in logical form to the database query in which a structure of the at least partially filled in logical form is used to form the database query as a structured database query.

9. The system as described in claim 1, further comprising a clarification generator module implemented at least partially in hardware to clarify at least one ambiguity contained in the natural language input by soliciting information from a user or infer appropriate values to use from a user's prior history or history of similar users automatically and without user intervention.

10. In a digital medium environment to classify a question included in a natural language input as part of answering a question included in the natural language input, a method implemented by a computing device, the method comprising:
   receiving a natural language input by the computing device;
   classifying the natural language input, by the computing device, as corresponding to respective ones of a plurality of classes by:
      extracting features from the natural language input including, for each word in the natural language input, building a feature representation by concatenating semantic and syntactic information; and
      processing the extracted features using a classifier model that is trained across a plurality of domains to obtain a question classification label based on each feature representation;
   generating a database query based at least in part on the obtained question classification label by the computing device, the generating including using the obtained question classification label to select at least one of a plurality of logical form templates that define a structure of the database query, the at least one of a plurality of logical form templates including:
      a pre-condition slot containing a first attribute that controls grouping of results of the database query;
      a post-condition slot containing a second attribute that constrains an order of the results of the database query; and a slot populated with an indicator of a statistical function selected based on the natural language input from a plurality of available statistical functions; and producing an answer to the question included in the natural language input by executing the database query against a database structured in accordance with the structure of the database query, the answer providing user assistance by responding to the question.

11. The method as described in claim 10, wherein the features are configured as part of a type taxonomy that is usable to support multilevel question classification that is definable using the question classification label.

12. The method as described in claim 10, wherein the generating further includes filling in the selected logical form template using a semantic entity and a semantic representation extracted from the natural language input.

13. The method as described in claim 12, wherein the semantic representation is a subject-predicate-object tuple that functions as a statement linking a subject of the subject-predicate-object tuple to an object of the subject-predicate-object tuple via a predicate of the subject-predicate-object tuple.

14. The method as described in claim 10, wherein the natural language input is received by the computing device via a typed input or spoken utterance.

15. The method as described in claim 10, wherein the syntactic information includes, for an adjective and an adverb, an actual adjective and an actual adverb in the natural language input, respectively, in place of part-of-speech tags, and the feature representation indicates whether said each word is constant or variable.

16. In a digital medium environment to extract a semantic intent of a question included in a natural language input as part of answering a question included in the natural language input, a method implemented by a computing device, the method comprising:

receiving a natural language input by the computing device;

generating part-of-speech tags for each word in the natural language input;

extracting the semantic intent of the natural language input automatically and without user intervention by the computing device as a semantic entity and a semantic representation of the natural language input based on the part-of-speech tags, the semantic representation configured as a subject, predicate, object tuple that functions as a statement linking the subject to the object via the predicate, the extracting including correcting a language error in the natural language input and a part-of-speech tag error resulting from the language error;

generating a database query based at least in part on the extracted semantic intent by the computing device, the generating including using the semantic entity or semantic representation to at least partially fill in a logical form template that defines a structure of the database query, the at least partially filled in logical form including:

a pre-condition slot containing a first attribute that controls grouping of results of the database query;

a post-condition slot containing a second attribute that constrains an order of the results of the database query; and a slot populated with an indicator of a statistical function selected based on the natural language input from a plurality of available statistical functions; and producing an answer to the question included in the natural language input by executing the database query against a database structured in accordance with the structure of the database query, the answer providing user assistance by responding to the question.

17. The system as described in claim 16, wherein the extracting of the semantic intent is performed automatically and without user intervention through use of one or more models that are configured to address language ambiguities contained in the natural language input.

18. The method as described in claim 16, wherein the generating further includes selecting the logical form template based on a classification of the question included in the natural language input.

19. The method as described in claim 16, wherein the natural language input is received by the computing device via a typed input or spoken utterance.

20. The system as described in claim 16, wherein the extracting the semantic intent includes extracting the subject, predicate, object tuple according to:

when extraction rules are available, the extraction rules; and when the extraction rules are not available, a greedy algorithm that uses a first verb expression encountered in the natural language input as a predicate of the subject, predicate, object tuple.

* * * * *